(12) United States Patent
Earley

(10) Patent No.: US 6,949,842 B2
(45) Date of Patent: Sep. 27, 2005

(54) CENTRIFUGAL WEIGHT CONTROL FOR A WIND OR WATER TURBINE

(76) Inventor: Matthew Earley, 3226 Atlantic Ave., P.O. Box 213, Allenwood, NJ (US) 08720

(*) Notice: Subject to any disclaimer, the term of this patent is extended or adjusted under 35 U.S.C. 154(b) by 25 days.

(21) Appl. No.: 10/967,456

(22) Filed: Sep. 28, 2004

(65) Prior Publication Data

US 2005/0062291 A1 Mar. 24, 2005

Related U.S. Application Data

(63) Continuation-in-part of application No. 10/091,088, filed on Mar. 6, 2002, now abandoned.
(60) Provisional application No. 60/303,884, filed on Jul. 10, 2001.

(51) Int. Cl.⁷ ............................................... F03D 9/00
(52) U.S. Cl. ........................... 290/55; 290/44; 74/572; 74/573 R; 74/89.23; 322/4
(58) Field of Search .............................. 290/55; 74/572, 74/573 R, 89.23; 322/4

(56) References Cited

U.S. PATENT DOCUMENTS 3,248,967 A * 5/1966 Lewis ........................ 74/572
4,926,107 A * 5/1990 Pinson ........................ 322/4

* cited by examiner

Primary Examiner—Nicholas Ponomarenko
Assistant Examiner—Yahveh Comas

(57) ABSTRACT

The centrifugal weight control is a means of regulating rpm's on the low speed shaft in a changing wind (or water) speed. As wind speed increases the weights are extended farther from their hub. This extension as wind speed increases does bring into play a greater inertial force. It is this greater inertial force that holds rpm's constant and, at the same time, increases rolling torque on the low speed shaft. With sufficient increase in rolling torque additional generators can be clutched into operation. Common knowledge in the business is that the energy content of the wind increases eight fold with each doubling of wind speed.

3 Claims, 6 Drawing Sheets

WT/CWC Side View

Water Turbine with Centrifugal Weight Control

**Block Diagram
Weight Position Control

Motor & Gear Set
For Jackscrew Control

CENTRIFUGAL WEIGHT CONTROL FOR A WIND OR WATER TURBINE

This Continuation in Part does reference and claim benefit of an earlier non-provisional application having a 03/06/2002 filing date and application Ser. No. 10/091,088, now abandoned, which in turn referenced a provisional application having a 07/10/2001 filing date and application No. 60/303,884.

BACKGROUND OF INVENTION

This invention is applicable to USPTO Classification 290 Sub-Classifications 43-44-53-55.

Today's wind and water turbines employ a variety of solutions to insure a constant operating speed (RPM). These include passive stall, active stall, pitch control and guide vanes. Each of these techniques effectively avoids capture of additional energy in an increasing flow so that rpm's can remain constant. A constant operating speed is necessary for 60 and 50 cycle (cycles per second) electrical environments on and off shore. Wind (and water) speeds above a given range are taken out of play in that these solutions do not transform additional energy into electricity at higher flow speeds. In a wind assumption the blades are pitched such that less surface is presented to an increasing wind. In a water assumption guide vanes are further closed to deflect the increased flow of water.

BRIEF SUMMARY OF INVENTION

The WT/CWC permits the capture and transformation of energy in an increasing flow (wind or water) while maintaining a desired operating speed. It does not, like other systems, avoid or deflect increases in flow to maintain operating speed. As the speed of a flow increases the weights of the CWC are extended. Such extension increases the rolling torque on the low speed shaft while maintaining desired rpm's. This CWC action permits capture and transformation of additional offered kinetic energy. Said extension of weights result in increases in inertial forces that are responsible for maintaining speed (rpm's) while increasing available rolling torque on the low speed shaft. This additional rolling torque is employed to drive additional generators under clutch control.

Figure 1:
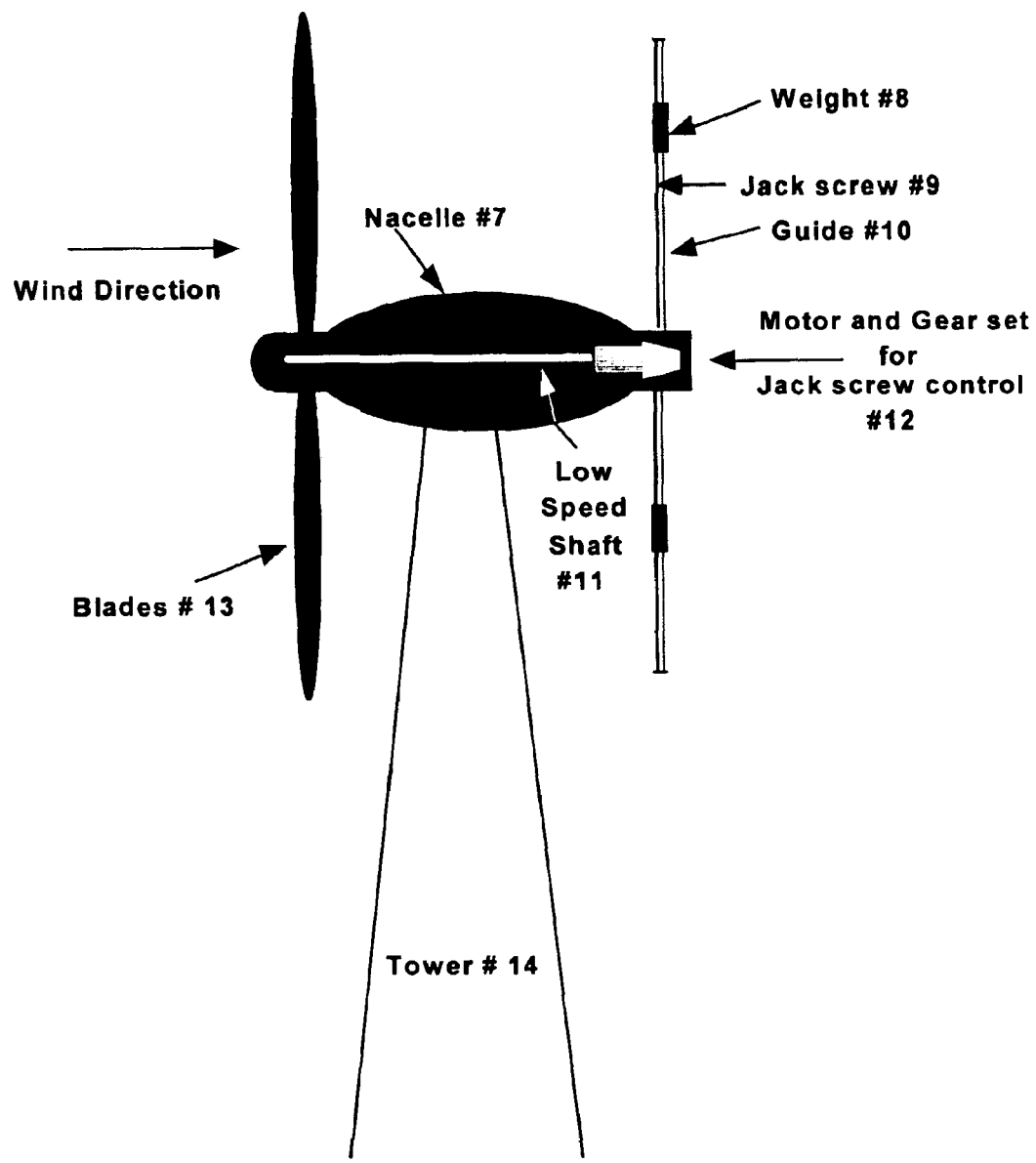
FIG. 1—side view complete wind system

In both drawings the CWC has a vertical position relative to rotors & wheels. This is principally for illustrative purpose and incidental to claims made.

REFERENCE NUMERALS

Figure 4:
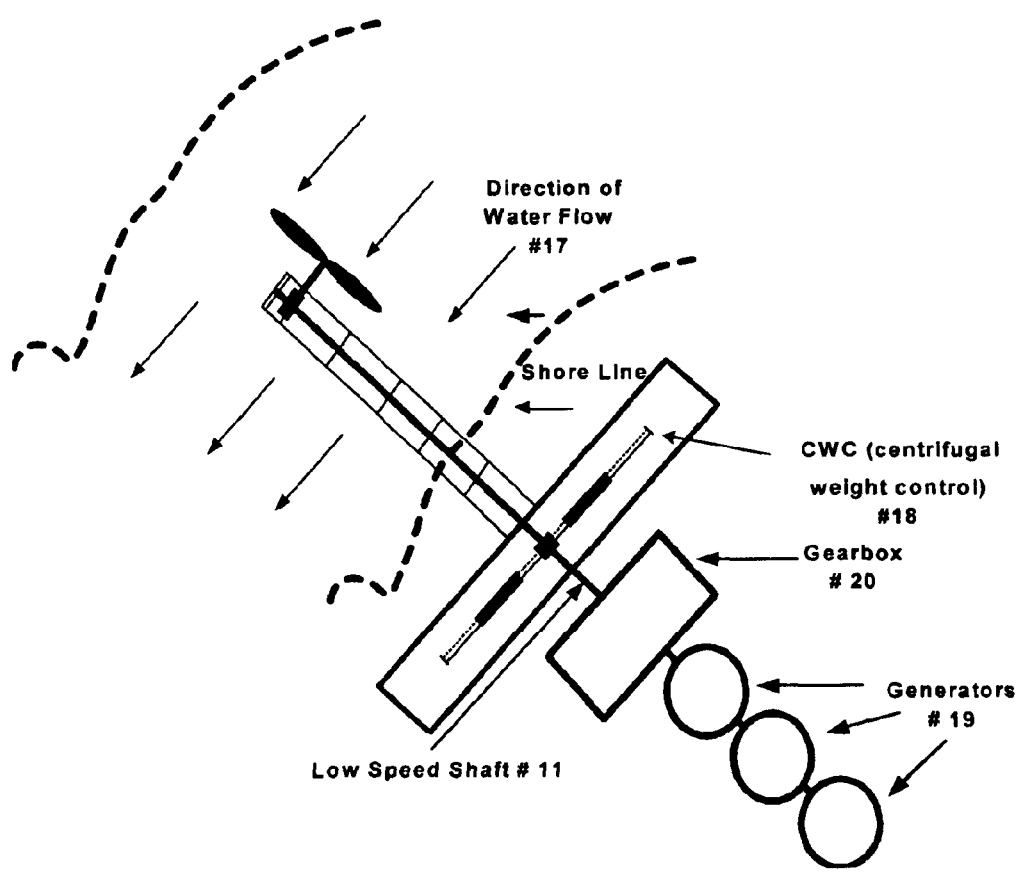
FIG. 4—top down view of complete water system

7. Nacelle
8. Weight
9. Jackscrew
10. Guide
11. Low Speed Shaft
12. Motor and Gear set for Jackscrew Control
13. Blades
14. Tower
15. Guide hole
16. Jackscrew—female
17. Direction of Water Flow
18. CWC (centrifugal weight control assembly) FIG. 4
19. Gearbox
20. Generators
21. Slip Rings
22. Gear end of jackscrew
23. Hub

DETAILED DESCRIPTION OF THE INVENTION

The WT/CWC design, which manipulates centrifugal weight to control rotor speed (and consequently generator speed) will deliver more energy as wind (or water) speeds increase while maintaining a desired operating speed (rpm's). At higher wind or water speed increments, additional generators will be brought into play as the foot-pounds of rolling torque on the low speed shaft increase.

In a water assumption, operating speed is typically controlled by guide vanes that open and close to regulate the amount of water that flows past the wheel (typical operation of a Francis Wheel). In a water turbine with CWC the low speed shaft would extend onto shore where CWC would then be applied. Only the rotor, low speed shaft and necessary infrastructure would be in the water (see FIG. 4). All other components (CWC/gearbox/generators/control/etc.) would be on shore.

Figure 2:
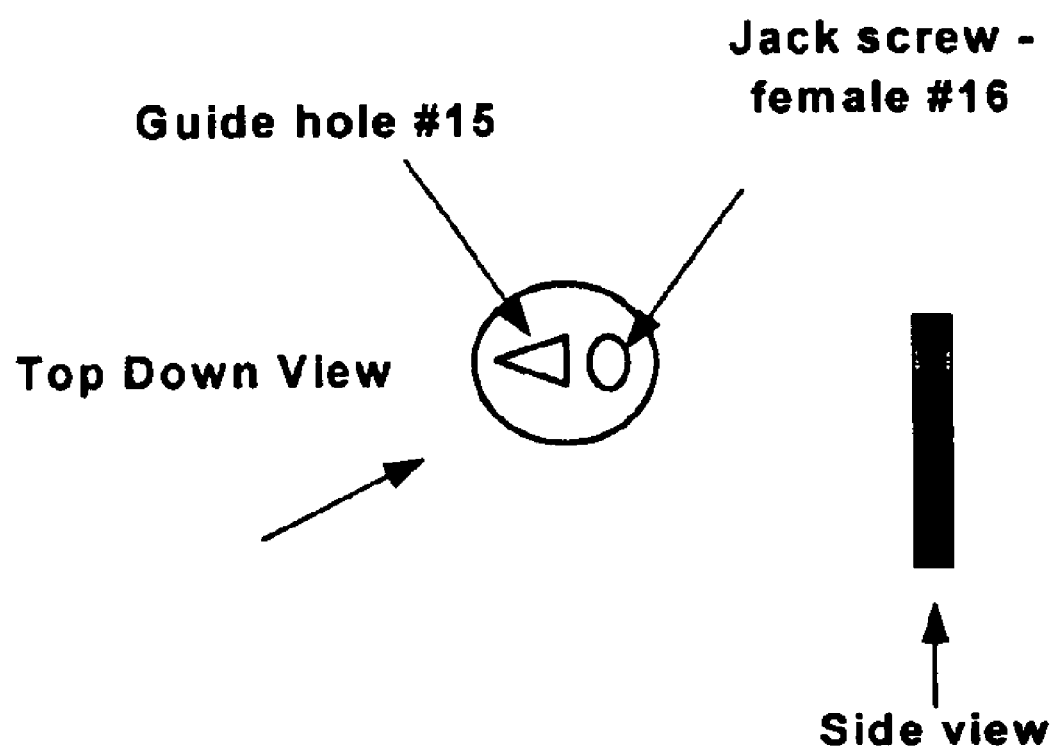
FIG. 2—top & side view of centrifugal weight
Figure 3:
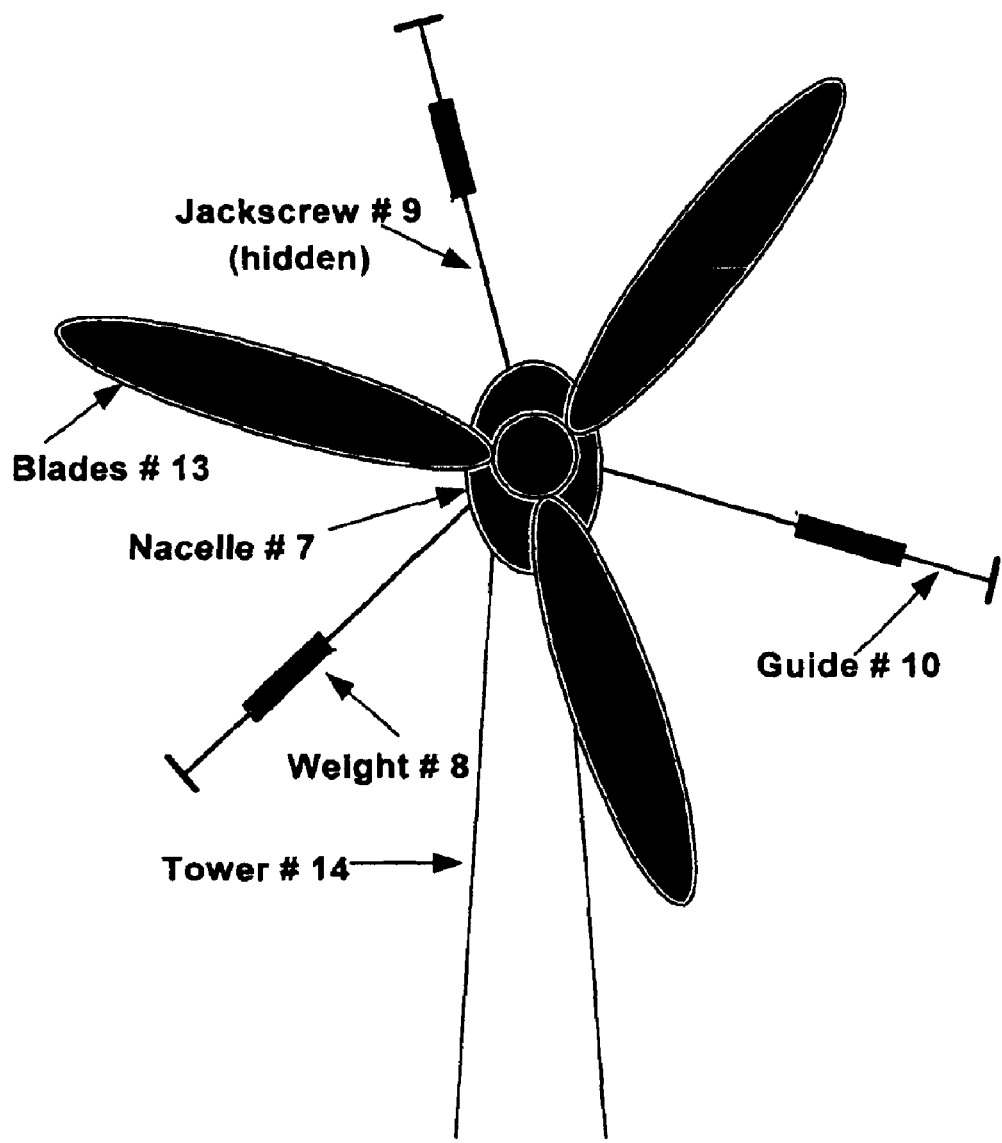
FIG. 3—front view of complete wind system

Description of WT/CWC: (see FIGS. 1,2, & 3)

1. At the far end of an extended low speed shaft (FIG. 1#10) are weights that extend up and down on their guides as wind speeds increase or decrease. These weights are on guides and move up and down with a "jack screw" type gear (FIG. 1#7-8-9). The guides anchor on a hub that is at the downwind end of the low speed shaft. The guides are simply steel rods on which the weights (FIG. 2#14-15-16-17) extend or retract as a function of wind speed. This "controlled action" will deliver a constant rotor speed and increasing foot-pounds of rolling torque as wind speeds increase above minimum ($1^{st}$ cut-in) speed.

2. In an increasing wind, extending weights farther away from the hub delivers an increasing centrifugal force (inertial force) that in turn holds rotor speed constant while delivering more rolling torque. As available rolling torque increases, additional generators (FIG. 4 #21) are brought into play and greater amounts of electrical energy are realized.

3. The "controlled action" is the synchronous movement of the centrifugal weights closer to or farther from their hub depending on wind speed. The weights, guides and jackscrews have minimal aerodynamic impact. In below figures and in bench test three weights, guides and jackscrews radiate from the hub. Having twice as many may prove to be a more stable and responsive design in full scale.

4. The jackscrews are under motor control that is, in turn, under microprocessor control. Maintaining desired rpm's, weight position and clutch control for $2^{nd}$ & $3^{rd}$ cut-in intervals will necessitate re-calibration/modification of existing algorithms that control multiple operations.

As one skilled in the art will appreciate, current control systems for active pitch can be re-employed to accommodate CWC (centrifugal weight control) in lieu of pitch.

Today's turbine systems having active pitch control (or active stall) employ hydraulics or stepper motors to change pitch of the blades. Necessary information for such control (which may vary by product and manufacturer) typically includes rotor revolutions, generator revolutions, shaft torque and/or generator current. With this empirical information, a computer (microprocessor) will, appropriately, signal the pitch change mechanism to increase or diminish the angle of attack of blades to maintain constant rpm's on the low speed shaft in a changing wind.

Moving weights along their jackscrews, as with changing pitch angle of the blades in current art, is a positioning application. One skilled in the art will appreciate this and choose to use same hardware and software to control weights along their jackscrews as they are currently used to control pitch.

Figure 5:
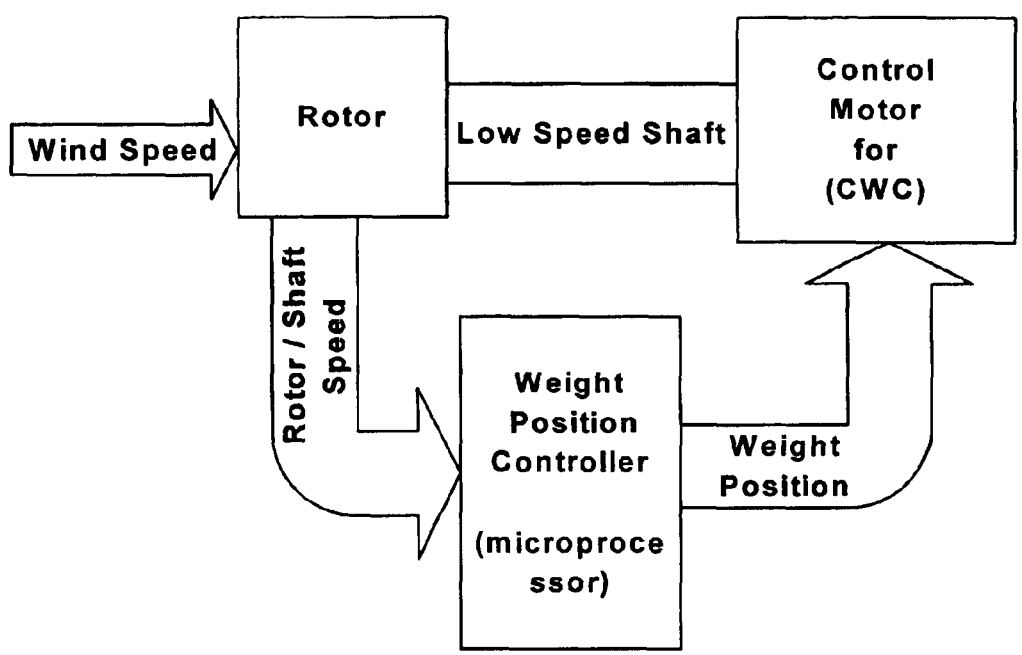
FIG. 5—block diagram
Figure 6:
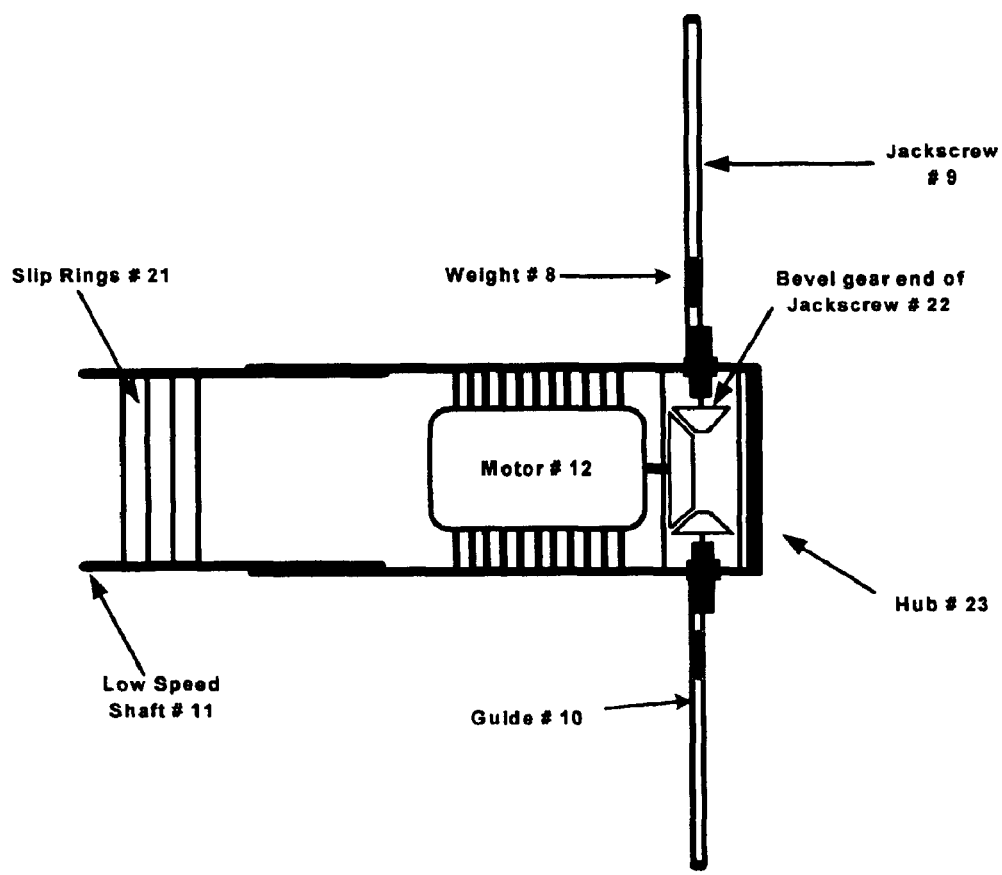
FIG. 6—motor & gear set

A variety of pitch control solutions in service today could be re-employed to sense a shaft speed and then signal a motor accordingly for appropriate weight position. A diagram (FIG. 5) in block form reflecting same control is attached. Available control solutions including those from Bosch Rexroth AG and MLS Electro Systems could readily be employed.

The existing microprocessor, programs, signaling, collectors, interfaces, gears, and hydraulic system or stepper motor can be re-employed for turning jackscrews in unison to control weight position that in turn control rpm's in lieu of traditional pitch or stall methods for same rpm control.

One example of motor control with centrifugal weight control (as reflected in FIG. #6) would be to terminate the hub end of the jackscrews as bevel gears with bearings that then mesh with a common bevel gear fixed to the shaft of a stepper motor. This motor, under program control, would turn jackscrews for appropriate positioning of weights to maintain rpm's as changes occur in the speed of a flow (wind or water). Other motors could be used including, for example, a rotary hydraulic motor. More sophisticated solutions typically found in large-scale wind turbine systems including independent movement of blades would not be necessary or appropriate.

The hub assembly to control the rotation of jackscrews of CWC (centrifugal weight control) in unison can be a simpler assembly with fewer moving parts than assemblies necessary for controlling rotation of blades in unison. Significant thrust and axial forces that must be dealt with in an active pitch or stall solution do not come into play with CWC (centrifugal weight control).

I claim:

1. A speed and torque control system for a turbine of a wind and water power generating assembly comprising:

a fluid turbine driving a low speed shaft;

a hub positioned at the end portion of said low speed shaft and rotating with the same speed as said shaft;

a plurality of centrifugal weight assemblies extending in radial direction from the hub each having a weight, a guide and a rotating jackscrew, wherein said guide and said jackscrew are passing through said weight;

a gear box positioned inside said hub for rotating said jackscrew;

a motor positioned inside the hub for rotating said jackscrew through said gear;

an electrical controller for controlling said motor and positioning said weights along radial guide in dependence on the required rotational speed of said shaft.

2. Apparatus as set forth in claim 1;

wherein the increase in inertial force, due to weight extension, both controls the rpm's and increases rolling torque on the low speed shaft.

3. Apparatus as set forth in claim 2;

wherein controlled centrifugal weights, being an inertial force, deliver increased rolling torque on the low speed shaft as wind speeds increase while maintaining desired rpm's; the increased energy content found in an increasing wind manifests it self as greater rolling torque on the low speed shaft.

\* \* \* \* \*